Figure 1:
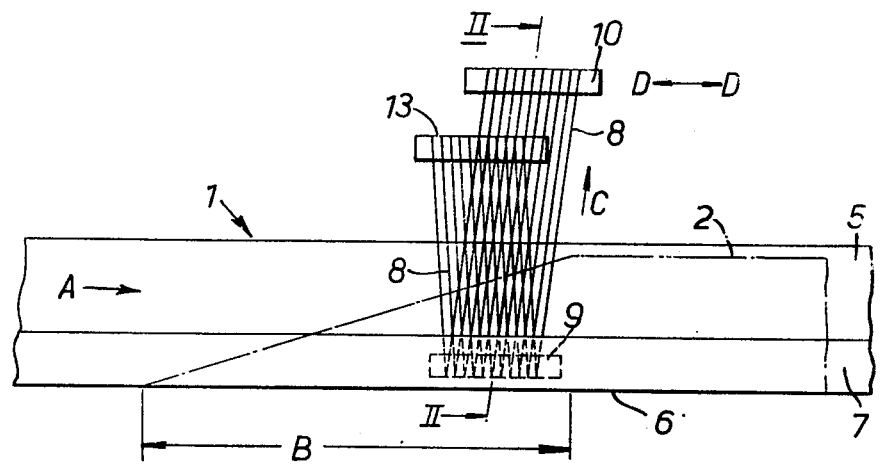

United States Patent [19]
Vreenegoor

[11] 3,965,228
[45] June 22, 1976

[54] CONTINUOUS PRODUCTION OF POLYMERIC FOAM

[75] Inventor: Nicholas Cornelis Vreenegoor, Hillegom, Netherlands

[73] Assignee: Unifoam AG, Glarus, Switzerland

[22] Filed: June 12, 1974

[21] Appl. No.: 478,510

[30] Foreign Application Priority Data
June 18, 1973 United Kingdom............... 28884/73

[52] U.S. Cl.................................... 264/39; 264/51; 425/817 R
[51] Int. Cl.².................. B29C 11/00; B29D 27/04
[58] Field of Search......................... 264/48, 54, 39; 65/DIG. 3–7, 51–54; 425/817

[56] References Cited
UNITED STATES PATENTS

| | | |
|---|---|---|
| 220,907 | 10/1879 | Arbogast........................ 65/DIG. 7 |
| 1,804,395 | 5/1931 | Blenko................................... 65/51 |
| 3,091,811 | 6/1963 | Hackert........................... 264/48 X |
| 3,719,734 | 3/1973 | Petzetakis....................... 264/54 X |

*Primary Examiner*—Philip Anderson
*Attorney, Agent, or Firm*—Lawrence E. Laubscher

[57] ABSTRACT

This invention relates to the production of continuous lengths of polymeric foam by depositing a foam mix in a moving open topped trough shaped conveyor by which it is conveyed and in which the mix foams freely and in the region when foaming takes place, contacting each side surface of the rising foam with an upwardly moving surface, preferably a system of upwardly moving wires interposed between each side surface of the rising foam and its adjacent side wall of the trough conveyor, the speed and direction of travel of the system of wires being selected so that the foam emerging from the foaming region has a flat upper surface.

7 Claims, 2 Drawing Figures

CONTINUOUS PRODUCTION OF POLYMERIC FOAM

This invention relates to the continuous production of polymeric foam, e.g. polyurethane foam.

In the production of polymeric foam slabstock or sheeting, an initially-liquid mixture of foam reactants is deposited on a continuously moving trough conveyor and as the mixture travels along with the conveyor it reacts and expands to many times its original volume. After expansion has ceased and the foam has cured, the resultant foam block is cut into so-called "buns" for subsequent conversion into whatever shape or size is required.

By "trough conveyor" is meant, for example, a conveyor movable beneath stationary rigid side walls, the conveyor and the side walls being lined with paper constituting a trough which moves with the conveyor. This and possible alternative arrangement are well known to those skilled in the art.

As is also well known, although the foam will naturally conform to the shape of the base and walls of the trough conveyor, the top surface of the foam will assume a convex shape due to friction between the foam and the trough walls, whereas desirably the top surface should be flat.

The object of the present invention is to provide a method and means for the continuous production of polymeric foam in a trough conveyor so that the resultant foam has a flat top.

According to one aspect of the invention, there is provided a method of continuously producing flat-topped polymeric foam in which a foam mix is deposited in a moving trough conveyor by which it is conveyed, and in the region where foaming of the mix occurs, (i.e. the foaming region), contacting each side surface of the rising foam with an upwardly moving surface provided by a system of upwardly moving wires interposed between each side surface of the rising foam and its adjacent side wall of the trough conveyor, the speed and direction of travel of said wires being selected so that the foam emerging from the foaming region has a flat top surface.

According to another aspect of the invention, there is provided an apparatus for the continuous production of flat-topped polymeric foam comprising a moving trough conveyor, feed means for depositing a foamable mix into said trough conveyor, a system of wires positioned in the trough conveyor at each side thereof in the region where foaming takes place (in the foaming region) to provide, in use, an upwardly moving surface for engaging a respective side surface of the rising foam, and means for continuously adjusting the speed and direction of travel of the wires in said upwardly moving surface so that the foam emerging from the foaming region has a flat top surface.

Figure 2:
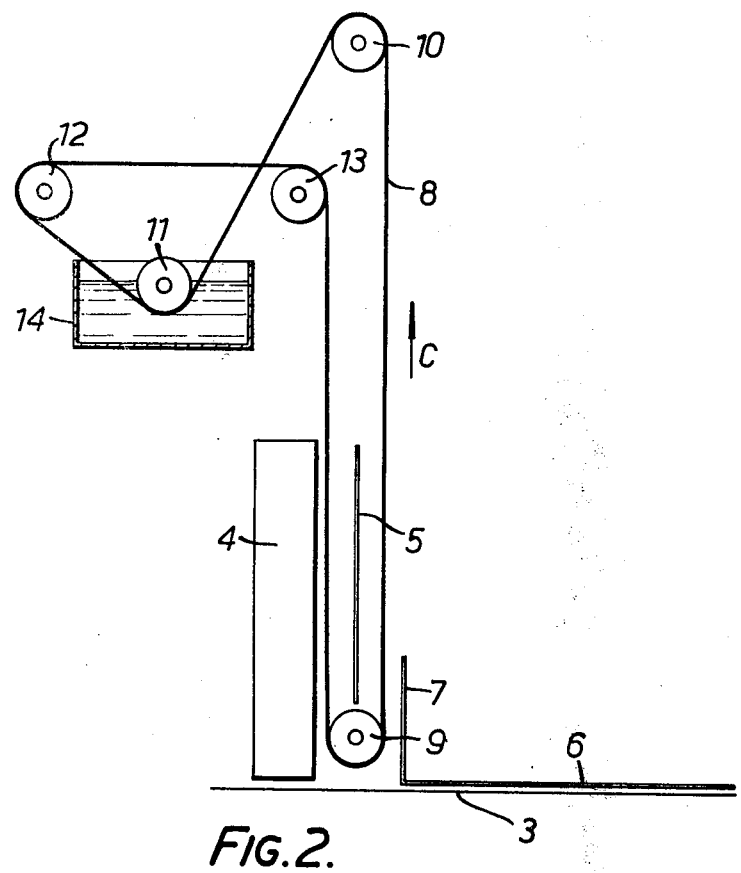

One embodiment of the invention will now be described, by way of example only, with reference to the accompanying diagrammatic drawings in which:

FIG. 1 is a diagrammatic internal side view of a trough conveyor at the foaming region; and FIG. 2 is a diagrammatic view on the line II—II of FIG. 1.

Referring to the drawings, a trough conveyor 1 moves in the direction of arrow A and carries polymeric foam, represented by chain-line 2, which expands through a foaming region B of the conveyor. The trough conveyor comprises a conveyor belt 3 moving beneath stationary side walls 4. The side walls are lined with paper side sheets 5 and the conveyor belt is lined with a paper bottom sheet 6 having upturned edge portions 7 overlapping the adjacent side sheet 6. The side and bottom sheets together constitute the conveyor trough which moves with the belt 3.

Located towards the downstream end of the foaming region is a system of wires, each wire 8 being formed as a continuous loop arranged around primary and secondary guide members such as bottom roller 9, and top roller 10, and further guide means including a cleaning roller 11 and two diverter rollers 12 and 13. Preferably the rollers are grooved to retain each wire in its correct location. Alternatively, each roller, or one or more of them, can be replaced by a series of pulley wheels mounted on a common shaft. At least one of the rollers, e.g. top roller 10, and possibly additional rollers, is driven so that the wires move upwardly from roller 9 to roller 10; that is, in the direction of arrow C.

It will be noted that the wires pass from roller 13 to bottom roller 9 between the stationary side wall 4 and the side sheet 5. From roller 9 the wires pass upwardly between side sheet 5 and the upturned edge portion 7 of the bottom sheet 6 to emerge from the top of the edge portion 7 and then pass over the surface of the side sheet 5 facing towards the interior of the moving trough conveyor. Thus, the system of wires in the trough provide, in use, an upwardly moving surface between the side walls of the trough and the rising foam for engaging each side surface of the rising foam in the foaming region. In FIG. 2 the various elements are depicted for clarify as having substantial spacings but, in practice, these spacings are minimal.

In order that the apparatus can be operated successfully continuously to produce polymeric foam having a flat top surface, various adjustments should preferably be provided to allow for such variables as conveyor speed, foam constituents and ambient atmospheric conditions.

Due to variations in ambient conditions and in the starting mixture of the chemicals deposited in the moving trough conveyor, it is not possible to predetermine exactly where along the conveyor the foam will commence to rise. The system of wires is therefore preferably mounted on a framework (not shown) positioned outside the conveyor trough and movable relative thereto in a direction either upstream or downstream of the foaming region B in the direction of arrows D.

Since the speed of movement of the wires and their angle of inclination with respect to the direction of movement of the conveyor must match that of the side walls of the rising foam with which they are in contact if the foam leaving the foaming region is to have a flat top surface, each system of wires is preferably adjustable in two other aspects. Firstly, the angle of inclination of the wires 8 relative to the direction of movement of the trough can be adjusted by moving the roller 10 along the conveyor relative to the fixed roller 9. A suitable slide arrangement (not shown) to permit this movement is provided on the movable framework carrying the rollers 9 and 10. Alternatively, the angle which the roller 9 makes with the horizontal can be arranged to be adjustable to permit the angle of inclination of the wires 8 to be altered. If this method of adjustment is used then the roller 10 would be similarly adjustable in attitude.

In the preferred embodiment illustrated, all the wires 8 travel upwardly at the same speed. However, in order to graduate the effect of the wires on the foam across the width of each system of wires, individual wires or groups of wires can be driven at different speeds by means of individual drive wheels (not shown), the speed of travel of the wires in contact with the rising foam being selected so that the foam emerging from the foaming region has a flat top surface.

In operation, with the trough conveyor travelling in the direction of arrow A and the wires travelling in the direction of arrow C, the foam commences to rise in the foaming region with the rising sides of the foam contacting the side sheets 5. The friction between the side sheets and the foam will prevent the side regions of the foam rising as fast as the central region but, on engaging the system of wires, the foam side regions are subjected to an upwardly-directed force due to adhesion between the foam and the wires. Thus the foam side regions are lifted by the wires, the speed of wire travel being selected so that foam emerging from the foaming region has a flat top surface.

The wires 8 will inevitably be coated with foam as they travel upwardly out of the trough conveyor and this must be removed before those sections of wire are returned to the bottom of the conveyor. Accordingly, as the wires pass around the cleaning roller 11 they are immersed in a cleansing solvent contained in a bath 14. One example of a suitable solvent is a solution of 1 part (by weight) polyol in 2.5 parts 1,1,1, trichloro-ethane (e.g. as sold under the trade name "Chlorothene V.G."). The cleansing action of such solvent may be improved by the addition of a small amount of acetic acid, e.g. between 0.01 and 0.05 parts, but care must be taken to ensure that solvent carried forward on the wires does not unacceptably reduce the required adhesion between the wires and the foam during the next cycle of operation.

The polyol used in the cleansing solvent will be one of those used in the starting mixture deposited in the conveyor from which the expanded foam is produced and will preferably have a molecular weight of between 3000 and 4000.

I claim:

1. The method of continuously producing flat-topped polymeric foam, comprising the steps of
   a. depositing a foamable thermosetting resin reaction mixture in the non-expanded condition in the bottom of a continuously moving trough conveyor in which the said reaction mixture begins to foam and rise upwardly;
   b. contacting each side surface of the rising foam, as the moving trough conveyor passes through a rising station, with a plurality of corresponding upwardly moving wires interposed between each side surface of the rising foam and the adjacent side wall of the moving trough conveyor; and
   c. subsequently returning said wires to the moving trough conveyor for engagement with another portion of the foam passing through said rising station in said moving trough conveyor.

2. The method defined in claim 1, wherein each upwardly moving portion of said wires is arranged adjacent the downstream end of the foam rising station.

3. The method defined in claim 1, and further including the step of continuously varying the angle of inclination of each of said upwardly moving wire portions within a given plane parallel with the longitudinal axis of the moving trough conveyor.

4. The method as defined in claim 1, and further including the step of continuously laterally displacing each of said upwardly moving wire portions in a given plane parallel with the longitudinal axis of the moving trough conveyor.

5. The method as defined in claim 1, and further including the step of continuously varying the speed of travel of at least some of said wires.

6. The method as defined in claim 1, and further including the step of cleaning residual foam from said wires after said wires leave the trough conveyor.

7. The method as defined in claim 6, wherein said wires are cleaned by passing the same through a cleansing solvent bath.

* * * * *